(12) United States Patent
Liu et al.

(10) Patent No.: US 8,926,231 B2
(45) Date of Patent: Jan. 6, 2015

(54) SOLID FUEL TRANSPORTING SYSTEM FOR A GASIFIER

(75) Inventors: Ke Liu, Rancho Santa Margarita, CA (US); Zhe Cui, Fountain Valley, CA (US); Wei Chen, Shanghai (CN); Mingmin Wang, Shanghai (CN)

(73) Assignee: General Electric Company, Niskayuna, NY (US)

( * ) Notice: Subject to any disclaimer, the term of this patent is extended or adjusted under 35 U.S.C. 154(b) by 578 days.

(21) Appl. No.: 12/569,278

(22) Filed: Sep. 29, 2009

(65) Prior Publication Data

US 2011/0072723 A1 Mar. 31, 2011

(51) Int. Cl.
 *B65G 53/48* (2006.01)
 *C10J 3/30* (2006.01)
 *C10J 3/50* (2006.01)
 *F23K 3/02* (2006.01)

(52) U.S. Cl.
 CPC . *C10J 3/30* (2013.01); *B65G 53/48* (2013.01); *C10J 3/50* (2013.01); *F23K 3/02* (2013.01); *F23K 2203/202* (2013.01); *C10J 2300/0916* (2013.01); *C10J 2300/093* (2013.01); *C10J 2300/094* (2013.01); *C10J 2200/158* (2013.01)
 USPC .............................................. 406/53; 406/56

(58) Field of Classification Search
 USPC ................ 406/52, 53, 55, 56, 57, 60, 61, 71; 198/657–677
 See application file for complete search history.

(56) References Cited

U.S. PATENT DOCUMENTS

| 2,841,101 | A | | 7/1958 | Hale et al. |
| 3,077,390 | A | * | 2/1963 | List et al. ........................ 48/54 |
| 3,399,637 | A | | 9/1968 | Hirschfield |
| 3,896,923 | A | * | 7/1975 | Griffith ........................ 198/661 |
| 4,109,966 | A | | 8/1978 | Boyhont et al. |
| 4,274,786 | A | * | 6/1981 | Svensson et al. ............. 414/218 |
| 4,322,221 | A | * | 3/1982 | Kamody ..................... 48/197 R |
| 4,363,571 | A | * | 12/1982 | Jackson et al. ................. 406/56 |
| 4,391,561 | A | * | 7/1983 | Smith et al. .................... 414/218 |
| 4,668,130 | A | * | 5/1987 | Sharp .............................. 406/14 |
| 4,978,369 | A | | 12/1990 | Pontow et al. |
| 5,052,874 | A | | 10/1991 | Johanson |
| 7,413,388 | B2 | * | 8/2008 | Krebs .............................. 406/55 |

(Continued)

FOREIGN PATENT DOCUMENTS

| DE | 202004003040 U1 | 4/2004 |
| JP | 5420495 U | 2/1979 |
| JP | 2004051258 A | 2/2004 |
| JP | 2004091570 A | 3/2004 |
| WO | 03008864 A1 | 1/2003 |

OTHER PUBLICATIONS

Search Report and Written Opinion From corresponding PCT Application No. PCT/US2010/045588, mailed on Jun. 22, 2011.
Japanese Office Action issued in connection with corresponding JN Application No. 2012530888 on Sep. 24, 2014.

*Primary Examiner* — William R Harp
(74) *Attorney, Agent, or Firm* — Ann M. Agosti

(57) ABSTRACT

A system for use in a gasification system comprises an increasing pitch screw feeder and a high-pressure vessel disposed about said increasing pitch screw feeder. The high-pressure vessel comprises an inlet for connection to an outlet of a solid pump and a conveyance gas line and an outlet through which solid fuel delivered from the solid pump is transported to a gasifier. The outlet is downstream of the solid pump and the conveyance gas line.

9 Claims, 4 Drawing Sheets

(56) References Cited

U.S. PATENT DOCUMENTS

| | | |
|---|---|---|
| 2005/0081766 A1 | 4/2005 | McIntosh |
| 2008/0145156 A1* | 6/2008 | Livingood et al. .............. 406/14 |
| 2009/0022570 A1 | 1/2009 | Craig et al. |
| 2009/0173005 A1 | 7/2009 | Neumann |
| 2009/0205252 A1 | 8/2009 | Tyer |

* cited by examiner

SOLID FUEL TRANSPORTING SYSTEM FOR A GASIFIER

BACKGROUND

The invention relates generally to coal and biomass gasification systems and, more particularly, to a system for transporting solid particulate fuel to a gasifier that is most likely operated at high pressure.

In current commercialized gasification systems, solid particulate fuel such as coal is fed into gasifier using either slurry feed or dry feed technologies. Due to the limitation in making slurry using high-moisture content solid particulate fuel, a dry feed system is normally utilized to feed such solid particulate fuel into gasifiers. In existing dry feed systems, low rank coals may be dried to remove two-thirds, or more, of the inherent moisture present in the coal. This improves the flow characteristics of the dried solids in the dry feed system equipment and the overall efficiency of the gasifier. However, the overall power production of the plant is reduced since the drying process consumes a large amount of energy.

In chemical, petrochemical, and power industries, most of the reactors such as gasifiers or combustors are operated under high-pressure conditions. Feeding solid fuels or reactants into a high-pressure gasifier with a pressure range of about 100 to about 1000 psi is a significant challenge. In existing gasification systems, either a slurry feeding system or a lock-hopper dry feeding system is used to feed solid fuels into a high-pressure gasifier. But, not all kinds of solid particulate fuels can be converted to slurry with a fairly high solid concentration. Therefore, a slurry feeding system may not be suitable for all kinds of solid particulate fuels.

In lock-hopper dry feeding system, solid fuels must be dried to a certain level to avoid rat-holing or bridging in the lock-hopper and reach a reasonable reliability. For example, brown coal must be dried to a moisture-content of less than about 10 percent and bituminous coal must be dried to a moisture-content of less than about 2 percent. However, existing dry feeding technologies may not handle solid fuels without pre-drying to a certain level.

It would therefore be desirable to provide a dry feeding system that can feed solid particulate fuels with high moisture content into a high-pressure gasifier without a pre-drying process.

BRIEF DESCRIPTION

In accordance with one embodiment disclosed herein, a system for use in a gasification system comprises an increasing pitch screw feeder and a high-pressure vessel disposed about said increasing pitch screw feeder. The high-pressure vessel comprises an inlet for connection to an outlet of a solid pump and a conveyance gas line and an outlet through which fuel delivered from the solid pump is transported to a gasifier. The outlet is downstream of the solid pump and the conveyance gas line.

In accordance with another embodiment disclosed herein, a system for use in a gasification system, comprises a solid pump for delivering a pressurized solid particulate fuel, a conveyance gas line, an increasing pitch screw feeder, a high-pressure vessel disposed about said increasing pitch screw feeder, and a flow line. The high-pressure vessel comprises an inlet for connection to an outlet of the solid pump and the conveyance gas line and an outlet downstream of the solid pump and the first conveyance gas line. The flow line connects the outlet to a gasifier to transport the solid particulate fuel delivered from the solid pump to the gasifier.

In accordance with another embodiment disclosed herein, a system for use in a gasification system, comprises a plurality of solid pumps for delivering a pressurized solid particulate fuel, a plurality of conveyance gas lines, an increasing pitch screw feeder having a minimum pitch at an upstream end and a maximum pitch at a downstream end, a high-pressure vessel disposed about said increasing pitch screw feeder, and a motor enclosed in the high-pressure vessel for driving the increasing pitch screw feeder. The high-pressure vessel comprises a plurality of inlets for connection to a plurality of solid pumps and at least one of the conveyance gas lines and an outlet through which fuel delivered from the solid pump is transported to a gasifier. The outlet is downstream of the solid pumps and the conveyance gas lines.

In accordance with another embodiment disclosed herein, a system for use in a gasification system, comprises a plurality of solid pumps for delivering a pressurized solid particulate fuel, a plurality of conveyance gas lines, an increasing pitch screw feeder having an increasing pitch in the direction of a flow in the high-pressure vessel with a minimum pitch at an upstream end and a maximum pitch at a downstream end, a high-pressure vessel disposed about said increasing pitch screw feeder, a flow line, and a motor enclosed in the high-pressure vessel for driving the increasing pitch screw feeder. The high-pressure vessel comprises a plurality of inlets for connection to a plurality of solid pumps and at least one of the conveyance gas lines and an outlet at said downstream end that is downstream of the solid pumps and the conveyance gas lines. The flow line connects the outlet to a gasifier to transport the solid particulate fuel delivered from the solid pump to the gasifier.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments disclosed herein include a system for transporting solid particulate fuel to a gasifier. The system mainly includes a screw feeder and a high-pressure vessel enclosing the screw feeder. Solid pumps and conveyance gas lines are connected to inlets of the high-pressure vessel. The outlet of the high-pressure vessel is connected to a gasifier such as a gasifier or a combustor. Fuel from the solid pumps enters the high-pressure vessel and transported to the outlet by the screw feeder. The fuel is subsequently transported from the outlet to the gasifier via a flow line. As used herein, singular forms such as "a," "an," and "the" include plural referents unless the context clearly dictates otherwise.

Figure 1:
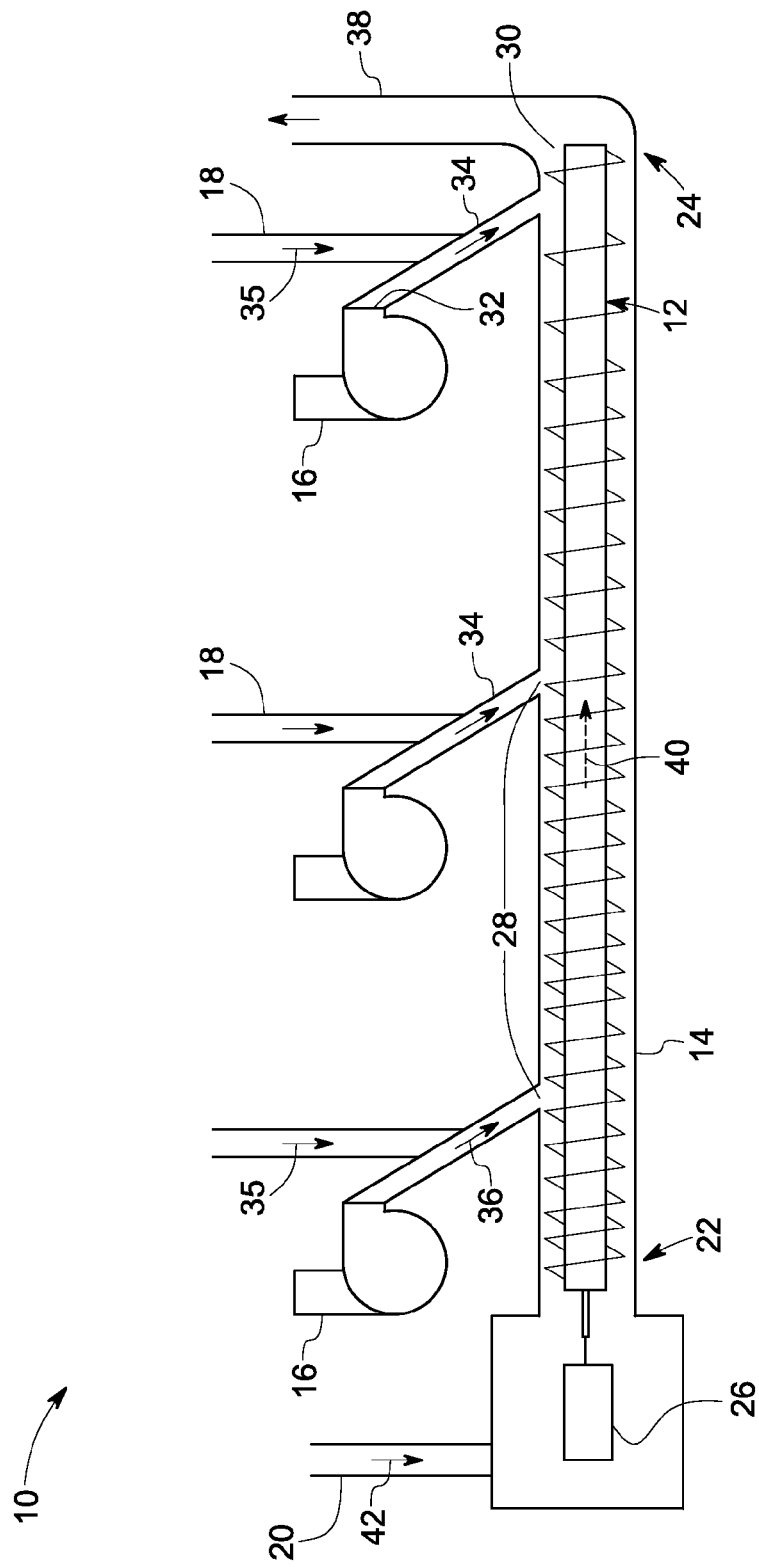
FIG. 1 illustrates an embodiment of a feed transporting system in accordance with aspects disclosed herein.

FIG. 1 illustrates an embodiment of the system 10 for transporting fuel to a gasifier. The system 10 includes an increasing pitch screw feeder 12, a high-pressure vessel 14 disposed about the screw feeder 12, solid pumps 16, and conveyance gas lines 18 and 20. The system 10 is employed in gasification systems that use solid particulate fuel including, but not limited to, coal, biomass, pet coke, oil sand, heavy oil, and mixtures thereof. In one embodiment, solids pumps are rotary, converging space Solids Transport and Metering pump utilizing STAMET™ POSIMETRIC® feed technology, otherwise known as a STAMET™ solids pump commercially available from GE Energy, Atlanta, Ga. This pump is capable of transporting solids from atmospheric pressure to pressures well over 1000 psig with a strongly linear relationship between pump rotational speed and solids mass flow.

The screw feeder 12 is enclosed in the high-pressure vessel 14. The pitch of the screw feeder 12 is minimum at an upstream end 22 of the vessel and maximum at a downstream end 24 of the vessel. The system 10 further includes a motor 26 for driving the screw feeder 12. The motor 26 is also enclosed in the high-pressure vessel 14.

The high-pressure vessel has a plurality of inlets 28 and an outlet 30. Each inlet 28 is connected to an outlet 32 of the solid pump 16 by pipelines 34. Conveyance gas lines 18 are in communication with the pipelines 34. A conveyance gas 35 is delivered through the conveyance gas lines 18 to enable delivery of solid particulate fuel 36 from the solid pump 16 to the high-pressure vessel 14. The system 10 also includes a dedicated conveyance gas line 20 that is directly connected to an inlet 28 of the high-pressure vessel 14 to enable transportation of fuel 36 to the outlet 32 of the high-pressure vessel 14. The outlet 32 is downstream of the solid pumps 16 and the conveyance gas lines 18 and 20. The pitch of the screw feeder 12 is maximum at the outlet 32. The outlet 32 is connected to a flow line 38. The flow line 38 delivers fuel to a gasifier.

The solid pumps 16 deliver pressurized solid particulate fuel 36 to the high-pressure vessel 14 via the pipelines 34. The solid particulate fuel 36 may include fuels such as, but not limited to, coal, biomass, pet coke, oil sand, heavy oil, and mixtures thereof. A high solid flow rate is achieved by connecting multiple solid pumps 16 to the high-pressure vessel 14. The screw feeder 12, driven by the motor 26, transports the solid particulate fuel 36 to the flow line 38 via the outlet 32. The pitch of the increasing pitch screw feeder 12 increases in the direction of a flow 40 in the vessel 14. Conveyance gas 42 delivered through the dedicated conveyance gas line 20 enables transmission of the solid particulate fuel 36 through the high-pressure vessel 14.

Figure 2:
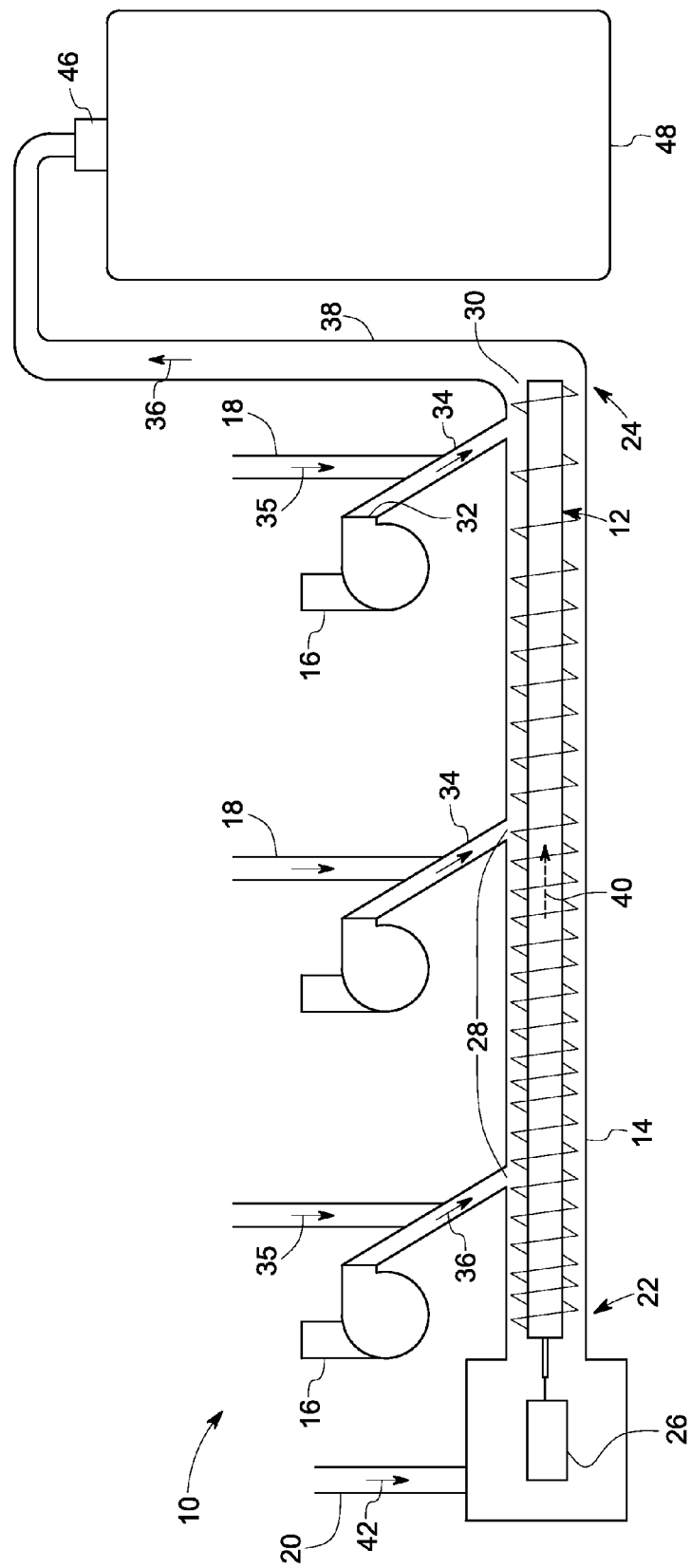
FIG. 2 illustrates the feed transporting system that is installed below a gasifier in accordance with aspects disclosed herein.

Referring to FIG. 2, conveyance gases 35 and 42 transport the solid particulate fuel 36 to the injector 46 of a gasifier 48 via the flow line 38. The flow line 38 is connected to the injector 46. In this embodiment, the fuel transportation system 10 with the solid pumps 16 is located on the ground or below the gasifier 48. The conveyance gases 35 and 42 are introduced from below the gasifier to carry the fuel 36 to the injector 46.

The entire screw feeder 12 and the motor 26 are enclosed in the high-pressure vessel 14. This enables the system 10 to be used under higher-pressure conditions. The system 10 maintains operating pressure of more than the pressure in a gasifier such as a gasifier 48 or combustor to which the system 10 is connected in order to maintain a positive pressure difference with the gasifier. In one embodiment, the system 10 has an operating pressure of more than about 500 psig.

Since the screw feeder 12 is enclosed in the high-pressure vessel 14 and the solid particulate fuel 36 is purged or carried by the conveyance gases 35 and 42, no extra sealing is necessary for the system 10. The high-pressure vessel 14 is pressurized by the conveyance gases 35 and 42 flowing through the conveyance gas lines 18 and 20 to maintain a positive pressure difference versus the gasifier 48. This positive pressure difference can avoid any syngas leakage from the gasifier 48 to the atmosphere through solid pumps 16. Also, the increasing pitch screw design of the screw feeder 12 achieves uniform gas-solid ratio during the mixing.

The fuel transporting system 10 can be employed as a dry feed system in gasification plants that use solid particulate fuel with high moisture content. Solid fuel conveyance in the flow line is operated in transport regime, leading to a dense phase transport flow of solid fuel in the system. In the transport flow regime, all solid particulates from the same solid pump 16 have substantially the same residence time. The solid pumps 16 can therefore be used as metering pumps in this system due to the transport flow of solid fuel. Some potential problems such as particulate bridging and rat-holing due to the high moisture level in solid fuels can be avoided. Therefore, solid particulate fuels with higher moisture level can be conveyed to gasifier without any pre-dry. The solid particulate fuel 36 is conveyed in transport flow regime, leading to a shorter residence time and thus smaller volume for the vessel 14.

Figure 3:
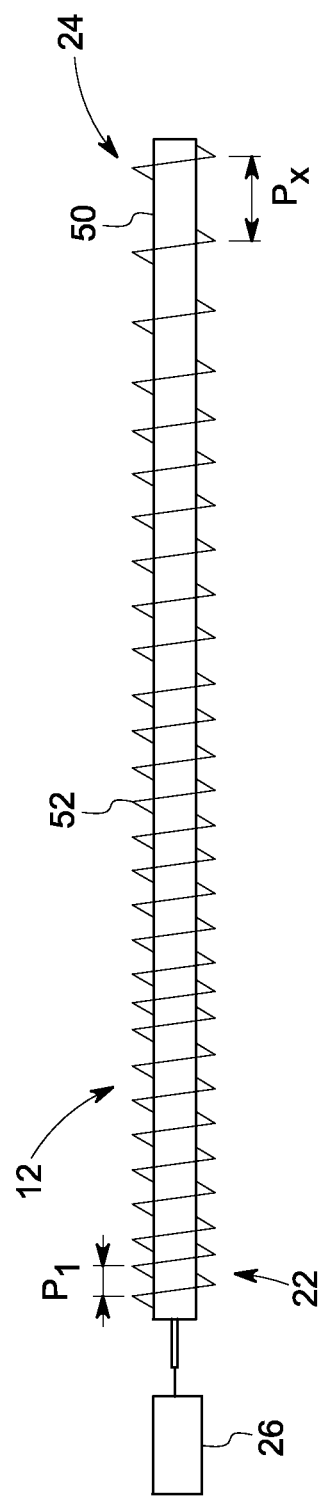
FIG. 3 illustrates the increasing-pitch screw feeder in accordance with aspects disclosed herein.

FIG. 3 illustrates the increasing pitch screw feeder 12. The screw feeder is connected to the motor 26. The screw feeder includes a shaft 50 and a screw thread 52 around the shaft 50. A pitch of a screw can be defined as the distance between two consecutive screw threads. The screw feeder 12 is an increasing pitch screw feeder in that the pitch between two consecutive threads increases in the direction of a flow in the vessel, i.e. along the length of the screw feeder. The pitch is minimum at an upstream end 22 and gradually increases towards the downstream end 24. The pitch is maximum at the downstream end 24. For example, the pitch "P1" at the upstream end 22 is the distance between first two consecutive threads and the pitch "Px" at the downstream end 24 is the distance between last two consecutive threads. The pitch of the screw feeder 12, i.e. the distance between all pairs of consecutive threads, gradually increases from "P1" to "Px." This distance is proportional to the solid flow at that location to maintain a uniform solid/gas ratio over the screw feeder. Consequently, the solid flow rate as well as solid loading ratio in the transport line 38 is constant.

Figure 4:
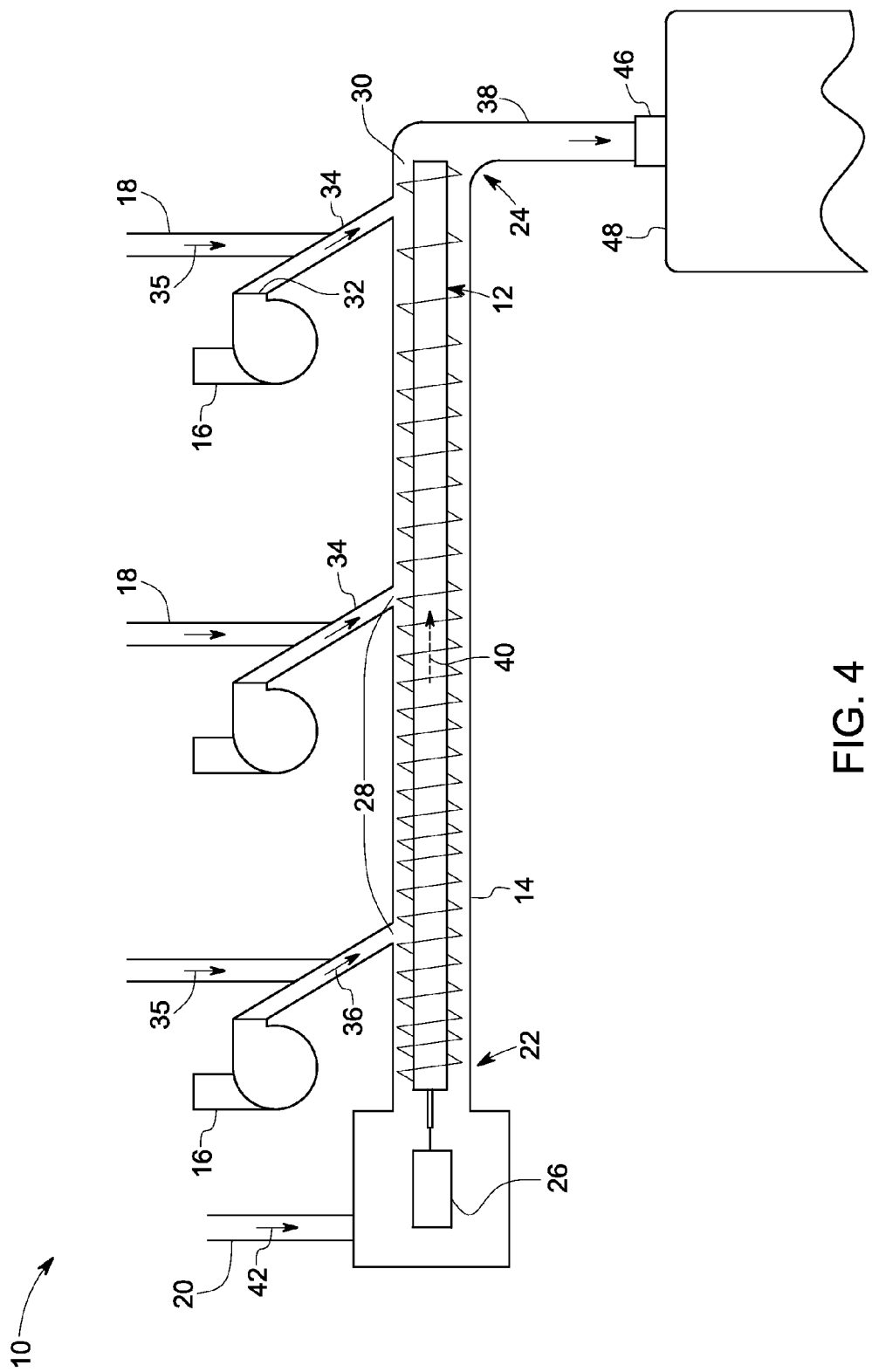
FIG. 4 illustrates the feed transporting system that is installed above a gasifier in accordance with aspects disclosed herein.

FIG. 4 illustrates another embodiment in which the fuel transporting system 10 with its solid pumps 16 is located above the gasifier 48 that is ~200 feet from the ground. The flow line 38 connects the outlet 30 of the high-pressure vessel 14 to the injector 46 of the gasifier 48. Conveyance gases 35 and 42 are introduced from above the gasifier 48 to carry the fuel 36 down to the injector 46.

The systems for transporting fuel to a gasifier described above thus provide a way to feed solid particulate fuels with high moisture level into high-pressure gasifiers such as a gasifier or a combustor without any pre-dry process, resulting in higher energy efficiency. The solid particulate fuel is transported in a plug-flow mode, leading to a smaller high-pressure vessel size and therefore reduced capital expenditure. The system can be used as a buffer to minimize the impact of the flow fluctuation from different solid pumps. Also, the solid pumps employed in the system can be used as metering instrument, which increases the flexibility and controllability of the system. The number of solid pumps and the increasing pitch screw can be selected based on the desired solid fuel feeding rate.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
   a high-pressure vessel including a plurality of inlets for receiving solid particulate fuel, an outlet located downstream of the plurality of inlets and through which the solid particulate fuel is delivered to a gasifier, and a screw feeder enclosed within the high-pressure vessel and comprising a pitch that increases in a direction of flow of the solid particulate fuel from the plurality of inlets to the outlet, and
   a plurality of pumps for delivering the solid particulate fuel to the high-pressure vessel through respective pipelines to respective ones of the plurality of inlets; and
   a plurality of conveyance gas lines, each conveyance line connected to a pipeline of a respective pump for delivering a conveyance gas that pressurizes the solid particulate fuel within the pipeline,
   wherein at least one of the plurality of inlets is situated at a first location of the high-pressure vessel and least one other of the plurality of inlets is situated at a second location of the high-pressure vessel such that the second location is situated downstream of the first location, wherein the pitch of the screw feeder is greater at the second location than at the first location, and
   wherein the system has an operating pressure greater than a pressure within the gasifier so as to maintain a positive pressure difference with the gasifier.

2. The system of claim 1 wherein the distance between consecutive threads of the screw feeder is spaced in a manner proportional to the solid flow so as to maintain a uniform gas-solid ratio over the screw feeder.

3. The system of claim 1 wherein the pitch of the screw feeder is maximum at the outlet of the high-pressure vessel.

4. The system of claim 1 further comprising a motor enclosed within the high-pressure vessel for driving the screw feeder.

5. The system of claim 4 further comprising a dedicated conveyance gas line connected to the high-pressure vessel upstream of the screw feeder to further pressurize the solid particulate fuel within the high-pressure vessel.

6. The system of claim 5 wherein the system has an operating pressure of more than about 500 psig, thereby enabling the solid particulate fuel to be delivered to the gasifier regardless of a difference in elevation between the high-pressure vessel and the gasifier.

7. The system of claim 1 further comprising a flow line connecting the outlet of the high-pressure vessel to the gasifier to transport the solid particulate fuel from the outlet of the high-pressure vessel to the gasifier.

8. The system of claim 1 wherein the pumps comprise rotary, converging space pumps.

9. The system of claim 8, wherein the rotary, converging space pumps are used as metering pumps.

* * * * *